(12) United States Patent
Borremans

(10) Patent No.: US 9,967,499 B2
(45) Date of Patent: May 8, 2018

(54) READOUT CIRCUIT FOR IMAGE SENSORS

(71) Applicant: IMEC vzw, Leuven (BE)

(72) Inventor: Jonathan Borremans, Lier (BE)

(73) Assignee: IMEC vzw, Leuven (BE)

( * ) Notice: Subject to any disclaimer, the term of this patent is extended or adjusted under 35 U.S.C. 154(b) by 512 days.

(21) Appl. No.: 14/515,263

(22) Filed: Oct. 15, 2014

(65) Prior Publication Data

US 2015/0102206 A1    Apr. 16, 2015

(30) Foreign Application Priority Data

Oct. 16, 2013   (EP) ..................................... 13189013

(51) Int. Cl.
| | | |
|---|---|---|
| H04N 5/378 | (2011.01) | |
| H04N 5/357 | (2011.01) | |
| H04N 5/243 | (2006.01) | |

(52) U.S. Cl.
CPC ............. *H04N 5/378* (2013.01); *H04N 5/243* (2013.01); *H04N 5/3575* (2013.01)

(58) Field of Classification Search
CPC ....... H04N 5/378; H04N 5/243; H04N 5/3575
See application file for complete search history.

(56) References Cited

U.S. PATENT DOCUMENTS

| | | |
|---|---|---|
| 5,053,770 A | 10/1991 | Mayer et al. |
| 6,396,048 B1 | 5/2002 | Schanz et al. |
| 6,750,906 B1 | 6/2004 | Itani et al. |
| 2004/0246154 A1 | 12/2004 | Aeby et al. |
| 2006/0214085 A1 | 9/2006 | Espen et al. |

FOREIGN PATENT DOCUMENTS

| | | |
|---|---|---|
| EP | 1538827 A1 | 6/2005 |
| JP | 05315962 A | 11/1993 |

OTHER PUBLICATIONS

Sharma et al., "A floating-point A/D converter uses low resolution DAC to get wide dynamic range," Int. J. Electronics, vol. 64, No. 5, 1988, pp. 787-794.

Piper, Johan, "Floating-point Analog-to-Digital Converter," Dissertation from Department of Electroscience, Lund University, Nov. 2004, pp. 1-7.

(Continued)

*Primary Examiner* — Twyler Haskins
*Assistant Examiner* — Angel L Garces-Rivera
(74) *Attorney, Agent, or Firm* — Knobbe Martens Olson & Bear LLP

(57) ABSTRACT

The present description relates to a readout circuit for digitizing an analog input signal of an imaging device into a digital output. The readout circuit comprises a pixel signal input for providing an analog signal from at least one imaging pixel element, a variable gain amplifier for providing an amplified signal of the analog signal by a gain factor, and a first analog to digital conversion means for quantizing the analog signal into a first digital signal. The circuit further comprises a control means for setting the gain factor of the variable gain amplifier by taking into account the first digital signal, and a second analog to digital conversion means for quantizing the amplified signal into a second digital signal. The circuit also comprises a digital output for outputting a signal determined as function of at least the second digital signal.

20 Claims, 4 Drawing Sheets

(56) References Cited

OTHER PUBLICATIONS

Nandakumar, S., "High resolution floating point ADC," M. Tech. Credit Seminar Report, Electronics Systems Group, EE Dept., IIT Bombay, Nov. 2004, pp. 1-19.
Groza, Voicu, "High-resolution Floating-point Analog-to-Digital Converter," Instrumentation and Measurement Conference, Proceedings of the 16th IEEE, 2001, 1663-1666.
Yuan, et al., "Floating-Point Analog-to-Digital Converter," The 6th IEEE International Conference on Electronics, Circuits and Systems, Proceedings of ICECS '99, vol. 3, 1999, pp. 1385-1388.
Extended European Search Report in European Patent Application No. 13189013.9, dated Apr. 9, 2014.

READOUT CIRCUIT FOR IMAGE SENSORS

CROSS REFERENCE TO RELATED APPLICATIONS

This application claims priority under 35 U.S.C. § 119 (a)-(d) to European Patent Application No. EP 13189013.9, filed Oct. 16, 2013, the disclosure of which is hereby incorporated by reference in its entirety.

BACKGROUND

Field of the Invention

The description relates to the field of image sensors. More specifically it relates to a device and method for providing a high dynamic range digital readout of at least one pixel of an image sensor.

Description of the Related Technology

An image sensor device may typically involve AD (analog-digital) conversion of a signal generated by semiconductor elements for detecting a physical quantity distribution, e.g. a radiative quantity such as a light intensity of incident light on a focal plane of the image sensor. Such image sensors may typically detect a distribution of a radiative quantity, such as photons, electrons or protons incident on the pixels. For example, such device may comprise a plurality of semiconductor elements arranged in an array which are sensitive to electromagnetic waves received from the environment, such as light or other types of photon radiation. Furthermore, methods for digital signal processing may be used for reading out and converting the physical quantity distribution into a suitable signal representation, e.g. a digitized electric signal. Image sensors with integrated ADCs (analog to digital converters) may typically apply a quantization of the analog pixel output signals to the digital domain.

A plurality of pixels may be logically arranged in rows and columns in an imaging device, according to a device design known in the art. For example, a pixel signal may be read out through a column parallel output arrangement. In such an address control system, typically one row in the pixel array or a sub-array thereof may be selected for concurrent access, such that the pixels in this row can be processed simultaneously and in parallel through column readout circuitry. For example, a column line may direct the pixel outputs to the readout circuitry, which may comprise an ADC for quantizing this signal. In this manner, a single row of pixels may be read out by selecting the pixel corresponding to this row in each column and processing all signals from this row in parallel by the dedicated readout circuitry of each column.

With the advance of technology, image sensors have become faster, while their pixel size keeps decreasing. For example, various problems associated with traditional charge coupled device (CCD) imaging sensors, e.g. which limited acquisition speed and pixel size, have been overcome by Complementary Metal-Oxide Semiconductor (CMOS) processing techniques. These techniques allow electrical signal amplification on the pixel level, e.g. in Active Pixel Sensors (APS).

For example, the achievable resolution of quantization of such devices as known in the art may have increased to more than 14 bit, the noise may have reduced to one electron readout noise or even less on average and the capture speed may have increased to more than 1000 frames per second. At the same time, the number of pixels is dramatically increased to for example more than 10 million.

This poses high demands on the ADC, which needs to be fast and provide low noise and high dynamic range quantization. Moreover, the ADC should preferably be small and have low power consumption, since thousands of such ADCs may be present on an imager chip.

These ADC requirements are stringent. However, for a large analog pixel output signal provided to the ADC as input signal, the resolution of the ADC may be less critical than for a small analog pixel output signal. For example, photon shot noise in the pixel, which may be substantially proportional to the square root of the signal, can be large for large signals, making high resolution and low-noise at such large signal not needed. However, typically ADCs or readout systems do not exploit this property.

One method known in the art for advantageously exploiting this property involves using a slope ADC with variable slope. However, slope ADCs may have the disadvantage of being relatively slow and may provide a relatively noisy readout compared to other AD conversion techniques.

SUMMARY OF CERTAIN INVENTIVE ASPECTS

It is an object of embodiments of the present invention to provide good and efficient image acquisition by image sensors.

It is an advantage of embodiments of the present invention that a high speed, area-efficient and low-power implementation is achieved in a readout circuit.

It is an advantage of embodiments of the present invention that correlated-double sampling (CDS) can be easily implemented, which may be advantageous in modern imaging devices.

It is an advantage of embodiments according to the present invention that low pixel noise levels are provided in image sensors.

It is an advantage of embodiments according to the present invention that a good dynamic range can be achieved for digitizing analog pixel signals in image sensors.

It is an advantage of embodiments according to the present invention that a small imager area can be achieved.

It is an advantage of embodiments according to the present invention that a low acquisition time can be achieved.

It is an advantage of embodiments according to the present invention that a simple and efficient means for digitizing analog pixel signals in an image sensor is provided.

The above objective is accomplished by a method and device according to the present invention.

The description relates to a readout circuit for digitizing an analog input signal of an imaging device into a digital output, comprising a pixel signal input for providing an analog input signal from at least one imaging pixel element, a variable gain amplifier for providing an amplified signal, said amplified signal being an amplification of said analog input signal by a gain factor, a first analog to digital conversion means for quantizing said analog input signal into a first digital signal, a control means for setting said gain factor of the variable gain amplifier by taking into account said first digital signal, a second analog to digital conversion means for quantizing said amplified signal into a second digital signal, and a digital output for outputting an output signal, said output signal being determined as function of at least said second digital signal.

The first analog to digital conversion means may determine the variable gain amplifier gain setting.

The second analog to digital conversion means may be adapted for providing a finer quantization than the first analog to digital conversion means.

The second analog to digital conversion means may furthermore be adapted for outputting less input-related noise than the first analog to digital conversion means.

The first analog to digital conversion means may comprise a first analog to digital converter and the second analog to digital conversion means may comprise a second analog to digital converter.

The input of the first analog to digital converter and the output of the variable gain amplifier may be electrically connected. The input of the second analog to digital converter may be electrically connected to the output of the variable gain amplifier, directly or by means of a switch.

The description relates also to a readout circuit of an imaging device, comprising:
- a pixel signal input configured for receiving an analog input signal from at least one imaging pixel element,
- a variable gain amplifier configured for providing an amplified analog signal, the amplified analog signal being an amplification of the analog input signal by a gain factor,
- a first analog to digital conversion means configured for quantizing the amplified analog signal into a first digital signal,
- a control means configured for setting the gain factor of the variable gain amplifier by taking into account the first digital signal,
- a second analog to digital conversion means configured for quantizing the amplified analog signal into a second digital signal, and
- a digital output configured for outputting an output signal, the output signal being determined as function of at least the second digital signal.

According to an exemplary embodiment, the analog input signal may be a static analog pixel input signal.

According to an exemplary embodiment, the first analog to digital conversion means is configured for quantizing the amplified analog signal, while being amplified by the variable gain amplifier, into a first digital signal and for detecting whether this amplified analog signal exceeds a predefined threshold. According to an exemplary embodiment, the control means is configured for setting the gain factor of the variable gain amplifier by taking into account instantaneously the first digital signal.

The readout circuit may comprise a switch for electrically disconnecting the input of the variable gain amplifier from the pixel signal input. The control means may be adapted for switching said switch in a non-conducting state when setting said gain factor and for switching said switch in a conducting state after said gain factor is set.

Said first analog to digital conversion means and said second analog to digital conversion means may comprise an analog to digital converter and switching means for electrically connecting said analog to digital converter to either the pixel signal input in a first state of said switching means or to the output of the variable gain amplifier in a second state of said switching means. The control means may be adapted for setting said switching means in the first state when setting said gain factor and for setting said switching means in the second state after said gain factor is set.

The variable gain amplifier may be adapted for subtracting an analog signal representative for the optical signal and a reset signal provided by said pixel signal input and for providing the amplified pixel signal, said amplified pixel signal being a correlated double sampling amplification of the subtraction of the signal representative for the optical signal and the reset signal by said gain factor.

The digital output may comprise a combination unit for outputting a combination signal of said first digital signal and said second digital signal. Said combination signal may be a weighted sum or weighted multiplication of said first and said second digital signal.

The readout circuit may further comprise at least one further variable gain amplifier electrically connected in a serial circuit to the output of the first variable gain amplifier, each of said at least one further variable gain amplifier providing a corresponding further amplified signal by amplifying the corresponding input of the at least one further variable gain amplifier by a corresponding further gain factor, and at least one further analog to digital conversion means, each further analog to digital conversion means being adapted for quantizing the corresponding further amplified signal into a further digital signal. The control means may be adapted for setting said further gain factor of each of the at least one further variable gain amplifier by taking into account a corresponding digital signal which is provided by the second analog to digital conversion means or an analog to digital conversion means of the at least one further analog to digital conversion means having its input connected to the input of said further variable gain amplifier.

The description also relates to an imaging device comprising a readout circuit as described above and at least one imaging pixel element for supplying an analog input signal to a pixel signal input of said readout circuit. The at least one imaging pixel element may comprise a plurality of pixel elements forming a logical pixel column of a pixel array.

The description also relates to a method for digitizing an analog input signal of a imaging device into a digital output, the method comprising obtaining an analog input signal from at least one imaging pixel element, quantizing said pixel signal input into a first digital signal, setting a gain factor of a variable gain amplifier by taking into account said first digital signal, amplifying said analog input signal by said gain factor to produce an amplified signal, quantizing said amplified pixel signal into a second digital signal, and outputting an output signal determined as function of at least said second digital signal.

The method may comprise providing a difference signal as analog input signal, said difference signal being a difference between a reset signal received from the at least one imaging pixel element and an analog signal representative for the optical signal received from the at least one imaging pixel element.

Outputting the output signal may comprise combining said first digital signal and said second digital signal.

Combining the first digital signal and the second digital signal may comprise determining a weighted sum or product to obtain a quantized representation of the analog input signal.

The method may further comprise setting the gain factor to a reference gain factor before quantizing said pixel signal input into a first digital signal by amplifying said analog input signal by said reference gain factor to produce a reference amplified signal and quantizing the reference amplified pixel signal into the first digital signal.

According to an exemplary embodiment, the method for digitizing an analog input signal of an imaging device into a digital output, comprises:
- obtaining an analog input signal from at least one imaging pixel element,
- setting the variable gain amplifier gain to a first value (e.g. a maximum value), amplifying the signal with a variable gain amplifier,
while amplifying the signal, quantizing the variable gain amplifier signal output into a first digital signal when the output exceeds a predefined threshold,
reducing a gain factor of a variable gain amplifier by taking into account the first digital signal,
continue amplifying the analog input signal by the gain factor to produce an amplified signal and quantizing the output signal until the variable gain amplifier's output signal is below a predefined threshold,
quantizing the amplified pixel signal into a second digital signal, and
outputting an output signal determined as function of at least the second digital signal.

Features from the dependent claims may be combined with features of the independent claims and with features of other dependent claims as appropriate and not merely as explicitly set out in the claims.

These and other aspects of the present solution will be apparent from and elucidated with reference to the embodiment(s) described hereinafter.

Figure 1:
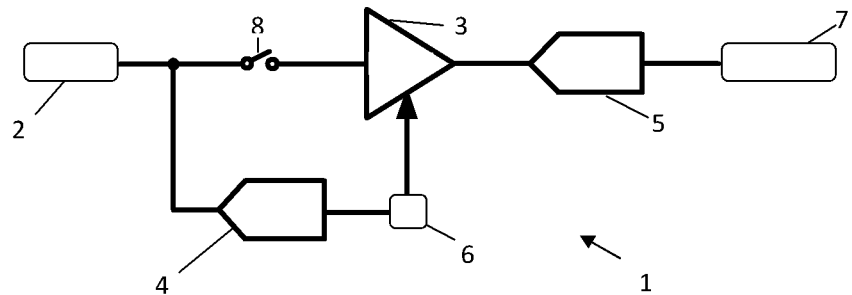
FIG. 1 shows an exemplary first readout circuit according to embodiments of the present description.

The drawings are only schematic and are non-limiting. In the drawings, the size of some of the elements may be exaggerated and not drawn on scale for illustrative purposes. In the different drawings, the same reference signs refer to the same or analogous elements.

DETAILED DESCRIPTION OF CERTAIN ILLUSTRATIVE EMBODIMENTS

The invention will be described with respect to particular exemplary embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where reference is made to the optical signal, in the readout circuit, reference may be made to an analog signal representative for the optical signal as detected in the pixel.

Embodiments of the present description relate to a pipelined architecture for image sensors that advantageously may offer a high speed, area-efficient, low-power implementation. Furthermore, embodiments of the present invention may also advantageously apply correlated-double sampling (CDS).

In a first aspect, the present description relates to a readout circuit for digitizing an analog input signal of an imaging device, e.g. an imaging sensor such as a CMOS image sensor, into a digital output. The readout circuit comprises a pixel signal input for providing an analog input signal from at least one imaging pixel element and a variable gain amplifier for providing an amplified signal, in which the amplified signal is an amplification of the analog input signal by a gain factor, e.g. a configurable gain factor or an adjustable gain factor. The device further comprises a first analog to digital conversion means for quantizing the analog input signal into a first digital signal and a control means for setting the gain factor of the variable gain amplifier by taking into account the first digital signal. The device also comprises a second analog to digital conversion means for quantizing the amplified signal into a second digital signal, and a digital output for outputting an output signal, in which this output signal is determined as function of at least the second digital signal.

Referring to FIG. 1, an exemplary readout circuit 1 is shown. This readout circuit 1 is adapted for digitizing an analog input signal of an imaging device into a digital output, e.g. such that a digitized output signal is produced for characterizing a radiative quantity observed by an imaging pixel element of the imaging device.

The readout circuit 1 comprises a pixel signal input 2 for providing an analog input signal from at least one imaging pixel element. For example, the readout circuit 1 may be integrated in the imaging device, e.g. in a CMOS image sensor, and may receive the analog input signal from a readout signal line having a plurality of pixel elements adapted for outputting a signal on the readout signal line operably connected thereto. The plurality of pixel elements may for example be configured in a logical pixel column of a pixel array.

In embodiments, the pixel signal input 2 may provide an analog input signal which is directly related to a signal received from at least one imaging pixel element, e.g. an analog signal representative for an optical signal related to the accumulated charge in the pixel element generated by the radiation incident on a radiation-sensitive component of the pixel during an exposure time interval. However, in other embodiments, the pixel signal input 2 may provide an analog input signal which is determined as a function of the optical signal, for example, a difference signal of an optical signal and a reset signal, such as a difference signal used in correlated double sampling techniques as known in the art.

Figure 3:
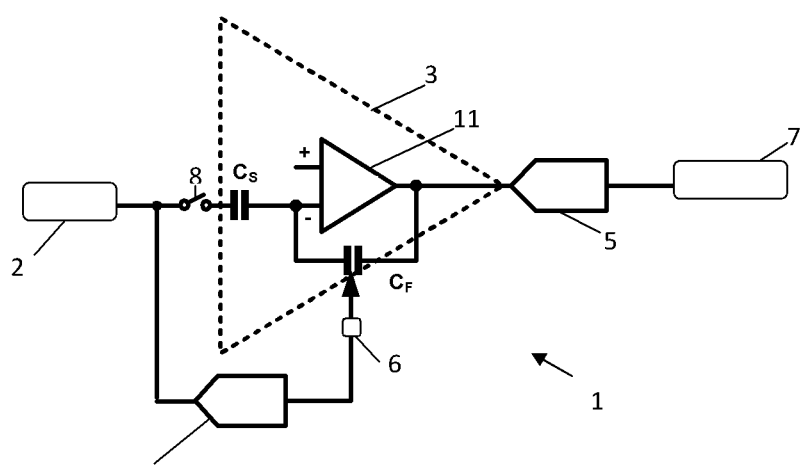
FIG. 3 shows an exemplary readout circuit implementing correlated double sampling according to embodiments of the present description.

The readout circuit 1 also comprises a variable gain amplifier 3 for providing an amplified signal by amplifying the analog input signal by a gain factor. The variable gain amplifier 3 may also be adapted for subtracting an analog signal representative of the optical signal and a reset signal provided by the pixel signal input, e.g. storing the reset signal and subtracting this reset signal from the analog signal representative for the optical signal which is provided subsequently through the pixel signal input 2. Thus, the amplified pixel signal may be provided as a correlated double sampling amplification of the pixel signal input. For example, such variable gain amplifier 3 adapted for subtracting the analog signal representative for the optical signal and the reset signal may comprise an input capacitor $C_S$, e.g. as shown in FIG. 3, for storing the reset signal at the input side of an operational amplifier 11 and subsequently subtracting this reset signal from the signal representative for the optical signal.

The readout circuit 1 further comprises a first analog to digital conversion means 4 for quantizing the analog input signal into a first digital signal. This first analog to digital conversion means 4 may comprise a first analog to digital converter, e.g. the first analog to digital conversion means 4 may consist of such first analog to digital converter. In a device according to embodiments of the present invention, the input of this first analog to digital converter, the input of the variable gain amplifier and the pixel signal input may be electrically connected, e.g. as shown in FIG. 1. The first analog to digital converter may be an ADC component as known in the art, such as a flash ADC, a single-slope ADC, a sigma-delta ADC or a delta-encoded ADC. Preferably, the first analog to digital converter is a simple ADC implementation, e.g. suitable for providing a coarse quantization of the input, and does not necessarily provide a good precision or low noise output, such as for example a direct-conversion ADC.

The readout circuit 1 also comprises a control means 6, e.g. a controller, for setting the gain factor of the variable gain amplifier 3 by taking into account the first digital signal. For example, if the first digital signal is below a predetermined threshold, a higher gain factor may be set, e.g. if the first analog to digital conversion means determines that the input signal is below 50% of the input range, a gain factor of 2 may be selected, while for values above this threshold, a unity gain may be selected. Likewise, if the input signal is determined to be below 25% of the input range, a gain factor of 4 may be set.

Thus, in a pipelined architecture according to embodiments of the present description, dynamic or conditional amplification of the analog to digital converter input may be applied. It is an advantage of such dynamic amplification that the ADC resolution may be lowered, and therefore that a low area and power consumption may be achieved. Furthermore, ADC noise requirements may be reduced, as low ADC power and area imply that the comparator noise and kT/C noise are relaxed.

For example, in a first phase of operation, the input signal may be measured with a coarse estimation. Next, the input signal is amplified only when the signal is very small, e.g. when the signal is below a predetermined threshold, and subsequently converted into the digital domain at a fine resolution.

The readout circuit 1 may furthermore comprise a switch 8 for electrically disconnecting the input of the variable gain amplifier 3 from the pixel signal input 2, and the control means 6 may be adapted for switching this switch 8 in a non-conducting state when setting the gain factor, and for switching said switch in a conducting state after said gain factor is set, e.g. such that the variable gain amplifier only produces the amplified signal after the appropriate gain factor is determined and set by the control means 6 and the input for the first analog to digital conversion means 4 is unaffected by the amplifier, e.g. by an input side impedance thereof, while this gain factor is determined.

For example, if the variable gain amplifier 3 is adapted for subtracting an analog signal representative for the optical signal and a reset signal, the switch may enable selecting the appropriate gain factor based on the analog signal representative for the optical signal without subtracted reset signal, while the reset offset is stored on, for example, an input-side capacitor $C_S$ in the variable gain amplifier. Then, the amplification of the subtracted signal may be performed by applying this gain factor, e.g. substantially multiplying the subtracted signal by the gain factor.

In such readout circuit, e.g. as shown in FIG. 3, first, the pixel reset signal may be supplied to the variable gain amplifier 3, e.g. by closing the switch 8, and the reset signal may be stored on the input capacitor $C_S$ as a charge $Q_{RESET}=C_S*V_{RESET}$. The reset signal may typically be small, and include kT/C noise and 1/f-noise. This reset signal may be subtracted from the image signal that is acquired later in order to reduce readout noise. The amplifier element 11 may be reset and its own offset and flicker noise may be sampled on the back plate of the input capacitor $C_S$.

Next, the image signal can be measured. For example, the reset of the amplifier element 11 may be turned off, and the pixel optical signal may be connected to the amplifier 3, e.g. by closing switch 8. The difference charge between the signal charge and reset charge $Q_{RESET}-Q_{SIG}$ will thus be pushed to the amplifier element 11. Hence, at the amplifier output appears:

$$V_{OUT}=(Q_{RESET}-Q_{SIG})/C_F=(C_S*V_{RESET}-C_S*V_{SIG})/C_F=(V_{RESET}-V_{SIG})*C_S/C_F.$$

Hence, if $C_S>C_F$, the difference signal appears amplified at the output. Such amplification may reduce the noise requirement for the second analog to digital conversion means 5. This amplification factor can be set based on signal level, determined by AD means 4.

The readout circuit 1 further comprises a second analog to digital conversion means 5 for quantizing the amplified signal into a second digital signal. The second analog to digital conversion means 5 may comprise a second analog to digital converter, e.g. the second analog to digital conversion means 5 may consist of such second analog to digital converter. In a device according to embodiments of the present invention, the input of such second analog to digital converter may be electrically connected to the output of the variable gain amplifier, e.g. as shown in FIG. 1. The second analog to digital converter may be an ADC as known in the art, for example, a direct conversion ADC, a ramp ADC, a multi-slope ADC, a sigma-delta ADC, a SAR ADC or a pipeline ADC, or any other type known by the person skilled in the art.

For example, assume the input signal has a value of 70% of the total input range. If this signal needs to be quantized at 10b, in a device as known in the art a 10b ADC would be needed. However, a value of 70% of the input range is large, and low-resolution is not needed for such large inputs for example due to shot noise, such as for example photon shot noise, dark shot noise, etc. Say that a 9b accuracy is desired, then the second analog to digital converter can be a 9b ADC. Assume now that the input signal is 5% of the input range. For this small value, one could need 10b resolution. However, when this small signal is detected, the amplifier gain may be doubled in a readout circuit according to embodiments of the present invention. Then, the smaller input signal may also be quantized with the 9b ADC. Hence, the signal will be quantized with 10b effective resolution, since the first bit has already been identified in the first step.

Furthermore, in particular embodiments, the second analog to digital conversion means 5 may be adapted to provide a finer quantization than the first analog to digital conversion means 4. It is an advantage of such embodiments that a coarse quantization by the first analog to digital conversion means 4 may be sufficient to select an appropriate gain factor, such that a low area size, power consumption and cost may be achieved by the first analog to digital conversion means 4. Furthermore, the second analog to digital conversion means 5 may also be adapted for outputting less input-related noise than the first analog to digital converter, such that the first analog to digital conversion means 4 may be a low cost analog to digital converter with relaxed constraints on noise characteristics.

While the second analog to digital conversion means 5 may provide a finer quantization, automatically setting an appropriate gain for the variable gain amplifier 3 in accordance with embodiments of the present invention may provide also here an advantage, since the resolution of the second analog to digital conversion means 5 may also be lower than would be preferable in an imaging device as known in the art, without substantial loss of quality of the digital output signal.

Figure 2:
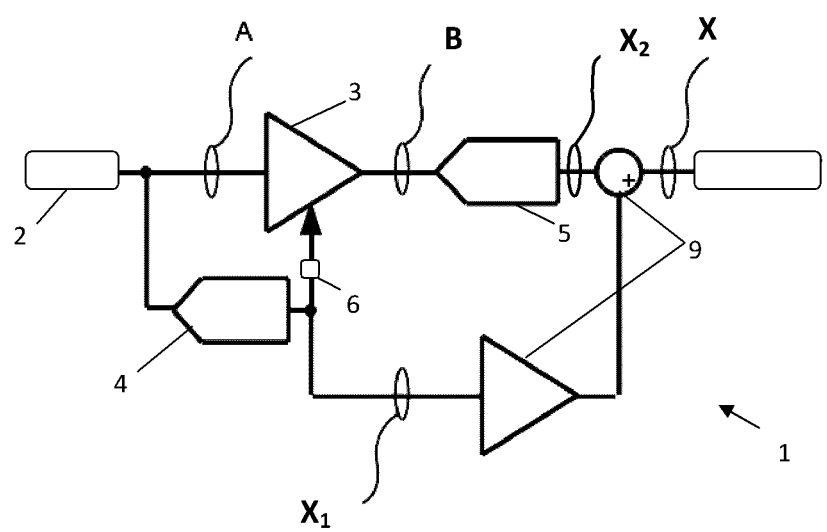
FIG. 2 shows an exemplary second readout circuit according to embodiments of the present description.
Figure 4:
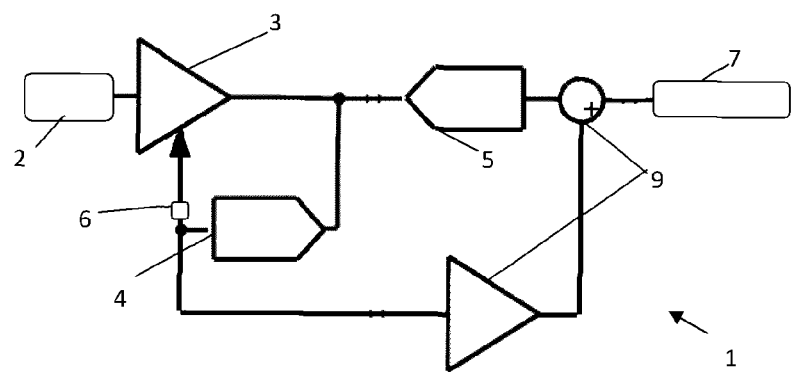
FIG. 4 shows an exemplary readout circuit according to embodiments of the present description.

The readout circuit 1 also comprises a digital output 7 for outputting an output signal, which is determined as function of at least the second digital signal. The digital output 7 may provide a signal derived from the second digital signal, e.g. the digital output may provide the second digital signal as output, e.g. as shown in FIG. 1. However, in embodiments according to the present description, the digital output 7 may also comprise a combination unit 9 for outputting a combination signal of the first digital signal and the second digital signal, e.g. as shown in FIG. 2 and FIG. 4. For example, the variable gain amplifier 3 may receive the analog input signal A and supply the amplified signal B to the second analog to digital conversion means 5 to be converted into the second digital signal $X_2$. The first analog to digital conversion means 4 provides the first digital signal $X_1$, which is used to set the gain of the variable gain amplifier 3. The combination signal X may be a weighted sum, e.g. an average, or weighted product of the first digital signal $X_1$ and the second digital signal $X_2$, e.g. the first digital signal may be digitally transformed, e.g. scaled, to take the gain factor into account and then combined with the second digital signal.

In another readout circuit 11 according to embodiments of the present description, e.g. as shown in FIG. 4, the first analog to digital conversion means 4 may comprise a first analog to digital converter and the second analog to digital conversion means 5 may also comprise a second analog to digital converter. However, in this arrangement, the input of the first analog to digital converter and the input of the second analog to digital converter may be both electrically connected to the output of the variable gain amplifier, during the time the input of the variable gain amplifier receives the pixel signal input. In such arrangement, the control means may be adapted for first setting the gain factor of the variable gain amplifier to for example the highest gain, e.g. such that the amplifier provides its input substantially amplified at its output. Then the control means may, for example reduce the gain during amplification, based on the output of the first analog to digital conversion means. For example, if the first analog to digital converter detects a too large output signal, it could reduce the gain. Finally, after this operation, the output value is determined.

Alternatively, there may be a switch between the output of the amplifier means and the second ADC converter means such that the second ADC conversion is performed after the operation of the amplifier means and the ADC means has completed.

Furthermore, the first analog to digital conversion means 4 and the second analog to digital conversion means 5 may also comprise switching means 13 for electrically connecting the analog to digital converter 12 to either the pixel signal input in a first state of the switching means, or to the output of the variable gain amplifier, in a second state of said switching means. The control means 6 may further be adapted for setting this switching means in the first state when setting the gain factor and for setting the switching means in the second state after the gain factor is set.

Figure 5:
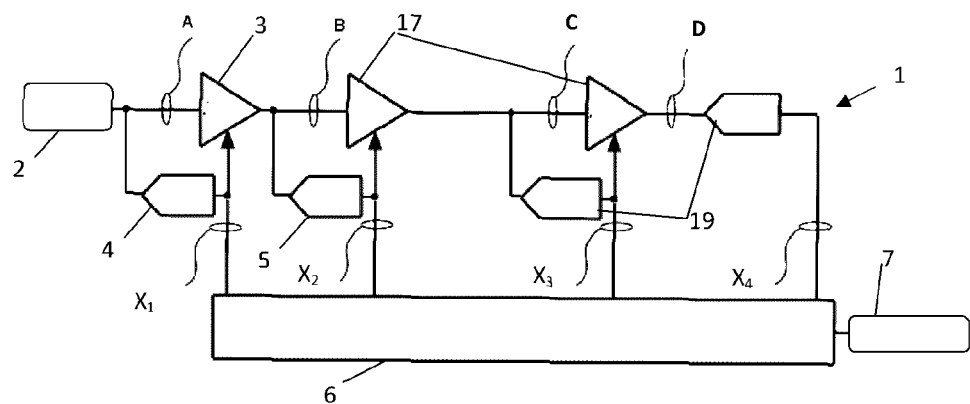
FIG. 5 shows another readout circuit according to embodiments of the present description.

In embodiments of the present description, the readout circuit may also comprise at least one further variable gain amplifier 17 electrically connected in a serial circuit to the output of the first variable gain amplifier, e.g. as shown in FIG. 5. For example, the readout circuit may comprise a further variable gain amplifier 17 having its output connected to the output of the first variable gain amplifier. The circuit may comprise a yet further variable gain amplifier having its input connected to the output of this further variable gain amplifier, and so on to create a series of variable gain amplifiers, each receiving its input from the output of a previous amplifier in the series. The or each of the at least one further variable gain amplifier 17 may provide a corresponding further amplified signal C, D by amplifying the corresponding output B, C of the previous variable gain amplifier by a corresponding further gain factor.

The circuit may also comprise at least one further analog to digital conversion means 19, in which each further analog to digital conversion means is adapted for quantizing the corresponding further amplified signal into a further digital signal $X_3$, $X_4$. The control means 6 may be adapted for setting the further gain factor of the or each of the at least one further variable gain amplifier 17 by taking into account a corresponding digital signal which is provided by the second analog to digital conversion means 5 or an analog to digital conversion means of the at least one further analog to digital conversion means 19 which has its input connected to the input of this further variable gain amplifier 17.

In a second aspect, the present invention also relates to an imaging device which comprises at least one readout circuit according to embodiments of the first aspect of the invention.

It will be understood by the person skilled in the art that the imaging device may comprise other components which may be optional components or standard features of imaging devices as known in the art, and which may be readily integrated into the imaging device by applying common knowledge and ordinary skill in the field. For example, the imaging device may also comprise an exposure sensor, a temperature sensor for calibration purposes, a processor for applying digital image processing, a storage means for storing a digital representation of the acquired image, optical components such as lenses, mirrors and/or diaphragms, a flash light, autofocussing means, user interface controls, a battery or power supply, and/or output means for exporting an acquired image to an external device or information carrier.

Such imaging device according to embodiments also comprises at least one imaging pixel element for supplying an analog input signal to a pixel signal input of the readout circuit 1. The at least one imaging pixel element may comprise a plurality of pixel elements forming a logical pixel column of a pixel array. For example, the imaging device may comprise a readout signal line and a plurality of pixel elements adapted for outputting a signal on the readout signal line. The plurality of pixel elements 2 may form a logical pixel column of a pixel array of the imaging device, and the readout signal line may thus be a column line for directing the pixel outputs to the readout circuit.

It will be understood by the person skilled in the art that the imaging device 1, as is known in the art in imaging devices, may comprise a plurality of such readout signal lines 3, each provided with a plurality of pixel elements, such that the pixel array may be read out in a column-parallel manner. While reference is made to a column, it will also be understood that this does imply a particular physical arrangement of the pixel elements in the pixel array, but merely to the logical addressing of pixels using an address system involving at least two coordinates which may be referred to as a logical column index and a logical row index.

In a third aspect, the present invention relates to a method for digitizing an analog input signal of an imaging device into a digital output. This method comprises obtaining an analog input signal from at least one imaging pixel element, quantizing the pixel signal input into a first digital signal, setting a gain factor of a variable gain amplifier by taking into account the first digital signal, amplifying the analog input signal by the gain factor to produce an amplified signal, quantizing the amplified pixel signal into a second digital signal, and outputting the output signal determined as function of at least the second digital signal.

Figure 6:
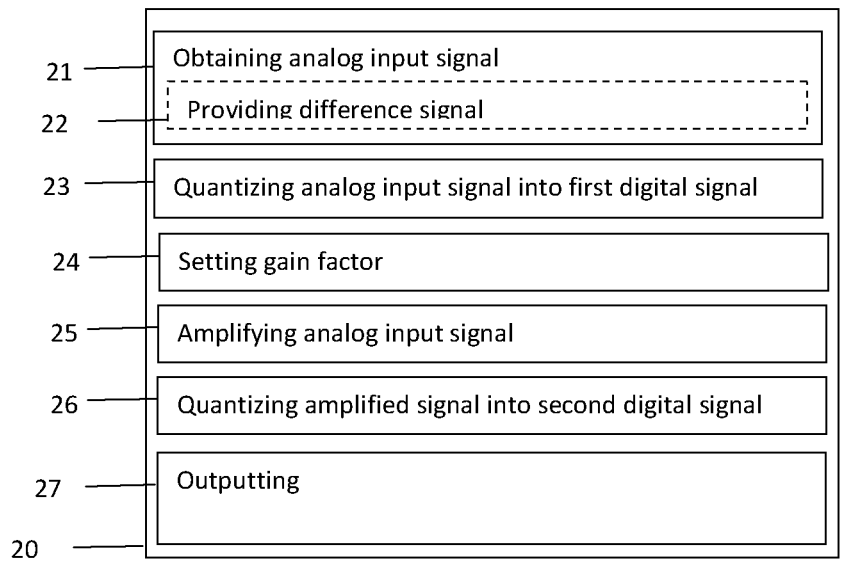
FIG. 6 shows an exemplary method for digitizing an analog input signal of an imaging device according to embodiments of the present description.

Referring to FIG. 6, an exemplary method 20 according to embodiments of the present invention is shown. The method 20 comprises obtaining 21 an analog input signal from at least one imaging pixel element. Obtaining 21 the analog input signal may comprise providing 22 a difference signal as analog input signal. This difference signal may be a difference between a reset signal received from the at least one imaging pixel element and signal representative of an optical signal received from the at least one imaging pixel element, e.g. a correlated double sampling (CDS) signal derived from the at least one imaging pixel element.

The method 20 further comprises quantizing 23 the pixel signal input into a first digital signal, and setting 24 a gain factor of a variable gain amplifier by taking into account the first digital signal. For example, setting this gain factor may comprise setting a higher gain factor when a small first digital signal is observed, and setting a lower gain factor when a large first digital signal is observed.

The method may also comprise setting the gain factor to a reference gain factor, e.g. to the maximum gain, before quantizing the pixel signal input into a first digital signal by amplifying the analog input signal by this reference gain factor to produce a reference amplified signal and quantizing the reference amplified pixel signal into the first digital signal.

The method 20 also comprises amplifying 25 the analog input signal by the gain factor to produce an amplified signal and quantizing 26 the amplified pixel signal into a second digital signal.

The method further comprises outputting 27 an output signal determined as a function of at least the second digital signal. This outputting 27 may comprise outputting a combination of the first digital signal and the second digital signal, for example by determining a sum, an average, a weighed sum, a multiplication or a weighed multiplication of the first digital signal and the second digital signal.

For example, in a first phase, the analog pixel signal, e.g. an image signal, needs to be measured. For example, the pixel may be connected to the input of a readout circuit such as a readout circuit according to embodiments of the first aspect of the present invention. In such a device as shown in FIG. 1, the switch 8 may be in a non-conducting state, while an ADC 4 determines a coarse estimation of the input signal, e.g. provides the first digital signal. Based on this coarse estimation, the gain of an amplifier 3 may be set. The coarse ADC 4, e.g. a low-resolution ADC, only needs to detect whether the signal is rather large or not. At these signal levels, noise is not very stringent, and the ADC 4 therefore needs not to provide low-noise digitization.

Then, for example, the switch 8 may be closed, e.g. set to a conducting state. The variable gain amplifier 3 may then amplify the signal with a gain depending on the output of the analog to digital conversion means 4. The second analog to digital conversion means 5 then quantizes the amplified signal. Since the signal is now amplified, the noise requirements of the analog to digital conversion means 5 may be relaxed. Due to such signal-dependent amplification, the resolution of the analog to digital conversion means 5 may also be reduced.

The advantages of embodiments of the present invention may thus include a reduced ADC resolution, e.g. thanks to the dynamically set gain. Hence, a lowered resolution in the ADC may facilitate low area and power consumption in a readout circuit. Furthermore, the ADC noise requirements may also be reduced, thanks to a higher gain setting when the input signal is low. This may also promote a low ADC power and area in a readout circuit, since comparator noise and kT/C requirements may be relaxed.

It is also an advantage of embodiments of the present invention that a simple circuit may be provided, e.g. no large additional circuit elements are needed, such as a digital to analog converter as may be required in a traditional pipeline readout circuit. The solution disclosed herein may advantageously exploit the property that noise and resolution requirements are less strict for large input signals.

Figure 7:
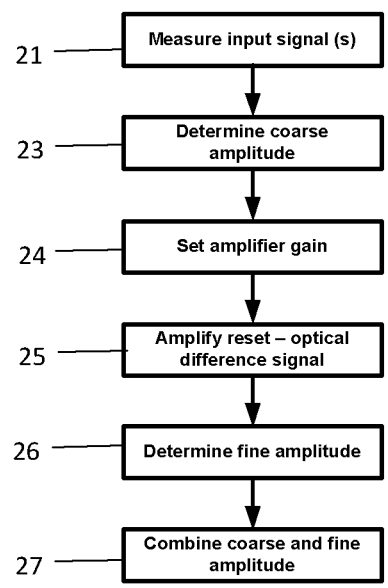
FIG. 7 shows another exemplary method for digitizing an analog input signal of an imaging device according to embodiments of the present description.
Figure 8:
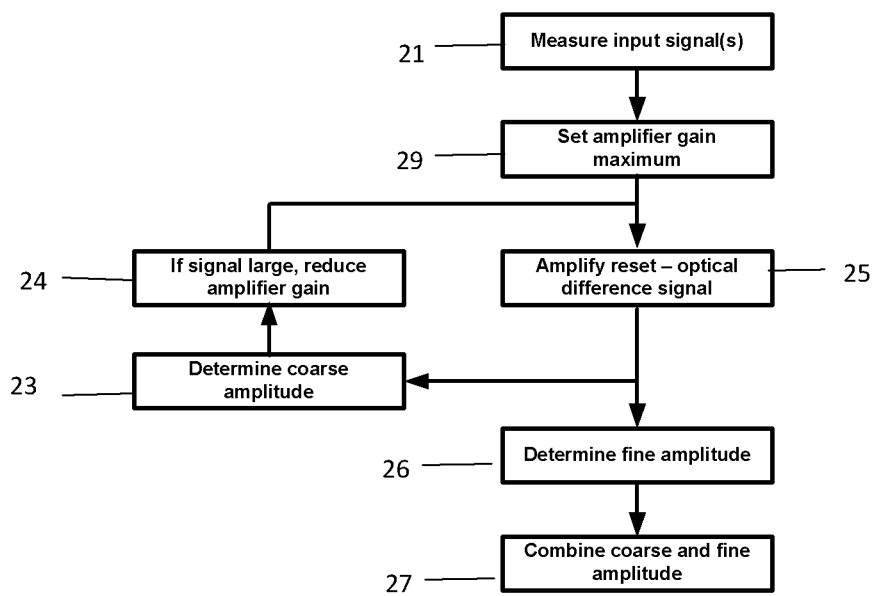
FIG. 8 shows an exemplary method according to embodiments of the present description.

Various examples of methods according to embodiments are further shown in FIG. 7 and FIG. 8. In the first example, shown in FIG. 7, an input signal is measured, e.g. an analog input signal is obtained 21 from at least one imaging pixel element. This may comprise providing a difference signal as analog input signal.

Then, a coarse amplitude is determined, e.g. the pixel signal input is quantized 23 into a first digital signal. In a next step, the amplifier gain is set, e.g. the gain factor of a variable gain amplifier is set 24 by taking into account the first digital signal.

Finally, the reset-optical difference signal is amplified and a fine amplitude is determined, e.g. the analog input signal is amplified 25 by the gain factor to produce an amplified signal, and the amplified pixel signal is quantized 26 into a second digital signal. Then, the coarse and fine amplitude may be combined as output, e.g. a combination of the first digital signal and second digital signal may be provided 27 as output signal.

In the second example, shown in FIG. 8, again, an input signal is measured, e.g. an analog input signal is obtained 21 from at least one imaging pixel element. This may comprise providing 22 a difference signal as analog input signal.

Then the amplifier gain may be set 29 to a reference value, e.g. to maximum gain, and the reset-optical difference signal is amplified, e.g. the analog input signal is amplified 25 by the gain factor to produce an amplified signal, Then a coarse amplitude is determined, e.g. the amplified signal is quantized 23 into a first digital signal. In a next step, the amplifier gain is reduced if the signal is determined to be large, e.g. the gain factor of a variable gain amplifier is set 24 by taking into account the first digital signal.

Then the reset-optical difference signal are amplified, e.g. the analog input signal is amplified 25 by the adjusted gain factor to produce an amplified signal, and the fine amplitude is determined, e.g. the amplified pixel signal is quantized 26 into a second digital signal. For example, this second digital signal may be provided 27 as output signal.

Furthermore, determining the coarse amplitude 23 and reducing the amplifier gain 24 may iterate until the coarse amplitude signal, e.g. the first digital signal, falls within a predetermined optimal signal range for determining the fine amplitude, e.g. the second digital signal.

What is claimed is:

1. A readout circuit of an imaging device, comprising:
   a pixel signal input configured to receive an analog input signal from at least one imaging pixel element;
   a variable gain amplifier configured to provide an amplified analog signal, the amplified analog signal being an amplification of the analog input signal by a gain factor;
   a first analog to digital conversion means for quantizing the analog input signal into a first digital signal;
   a control means for setting the gain factor of the variable gain amplifier by taking into account the first digital signal;
   a second analog to digital conversion means for quantizing the amplified analog signal into a second digital signal; and
   a digital output configured to output an output signal, the output signal being determined as function of at least the second digital signal, wherein the first analog to digital conversion means is configured to provide a coarse quantization of the analog input signal and the second analog to digital conversion means is configured to provide a finer quantization of the amplified analog signal than the first analog to digital conversion means.

2. The readout circuit according to claim 1, wherein the first analog to digital conversion means for quantizing determines the variable gain amplifier gain setting.

3. The readout circuit according to claim 1, wherein the input of the first analog to digital conversion means for quantizing, the input of the second analog to digital conversion means for quantizing and the output of the variable gain amplifier are electrically connected.

4. The readout circuit according to claim 1, wherein the variable gain amplifier is adapted for subtracting an analog signal representative for the optical signal and a reset signal provided by the pixel signal input and for providing the amplified pixel signal, the amplified pixel signal being a correlated double sampling amplification of the subtraction of the signal representative for the optical signal and the reset signal by the gain factor.

5. The readout circuit according to claim 1, wherein the digital output comprises a combination unit for outputting a combination signal of the first digital signal and the second digital signal.

6. The readout circuit according to claim 1, further comprising:
   at least one further variable gain amplifier electrically connected in a serial circuit to the output of the first variable gain amplifier, each of the at least one further variable gain amplifier providing a corresponding further amplified signal by amplifying the corresponding input of the at least one further variable gain amplifier by a corresponding further gain factor; and
   at least one further analog to digital conversion means for quantizing the corresponding further amplified signal into a further digital signal,
   wherein the control means for setting the gain factor comprises control means for setting the further gain factor of each of the at least one further variable gain amplifier by taking into account a corresponding digital signal which is provided by the second analog to digital conversion means for quantizing or the at least one further analog to digital conversion means for quantizing having its input connected to the output of the further variable gain amplifier.

7. An imaging device comprising a readout circuit according to claim 1, and at least one imaging pixel element for supplying an analog input signal to a pixel signal input of the readout circuit.

8. The imaging device according to claim 7, wherein the at least one imaging pixel element comprises a plurality of pixel elements forming a logical pixel column of a pixel array.

9. A method for digitizing an analog input signal of an imaging device into a digital output, the method comprising:
obtaining an analog input signal from at least one imaging pixel element;
coarse quantizing the analog input signal into a first digital signal;
setting a gain factor of a variable gain amplifier by taking into account the first digital signal;
amplifying the analog input signal by the gain factor to produce an amplified signal;
fine quantizing the amplified pixel signal into a second digital signal; and
outputting an output signal determined as function of at least the second digital signal.

10. The method according to claim 9, wherein obtaining an analog input signal from at least one imaging pixel element comprises providing a difference signal as analog input signal, the difference signal being a difference between a reset signal received from the at least one imaging pixel element and an analog signal representative for the optical signal received from the at least one imaging pixel element.

11. The method according to claim 9, wherein outputting the output signal comprises combining the first digital signal and the second digital signal.

12. The method according to claim 11, wherein combining the first digital signal and the second digital signal comprises determining a weighted sum or product to obtain a quantized representation of the analog input signal.

13. The method according to claim 9, further comprising setting the gain factor to a reference gain factor before quantizing the pixel signal input into a first digital signal by amplifying the analog input signal by the reference gain factor to produce a reference amplified signal and quantizing the reference amplified pixel signal into the first digital signal.

14. A readout circuit of an imaging device, comprising:
means for receiving an analog input signal from at least one imaging pixel element;
means for providing an amplified analog signal, the amplified analog signal being an amplification of the analog input signal by a gain factor;
a first analog to digital converter configured to quantize the analog input signal into a first digital signal;
a controller configured to set the gain factor of the variable gain amplifier by taking into account the first digital signal;
a second analog to digital converter configured to quantize the amplified analog signal into a second digital signal; and
a digital output configured to output an output signal, the output signal being determined as function of at least the second digital signal, wherein the first analog to digital converter is configured to provide a coarse quantization of the analog input signal and the second analog to digital converter is configured to provide a finer quantization of the amplified analog signal than the first analog to digital converter.

15. The readout circuit according to claim 14, wherein the means for receiving an analog input signal comprises a pixel signal input.

16. The readout circuit according to claim 14, wherein the means for providing an amplified analog signal comprises a variable gain amplifier.

17. The readout circuit according to claim 14, wherein the first analog to digital converter determines the variable gain amplifier gain setting.

18. The readout circuit according to claim 14, wherein the input of the first analog to digital converter, the input of the second analog to digital converter, and the output of the means for providing an amplified analog signal are electrically connected.

19. The readout circuit according to claim 16, wherein the variable gain amplifier is configured to subtract an analog signal representative for the optical signal and a reset signal provided by the pixel signal input, and further configured to provide the amplified pixel signal, the amplified pixel signal being a correlated double sampling amplification of the subtraction of the signal representative for the optical signal and the reset signal by the gain factor.

20. The readout circuit according to claim 14, wherein the digital output comprises a combination unit configured to output a combination signal of the first digital signal and the second digital signal.

* * * * *